United States Patent [19]

Engstrom et al.

[11] 3,825,909

[45] July 23, 1974

[54] SOLID STATE SWITCH STRUCTURE

[75] Inventors: Keith A. Engstrom, River Grove; Victor M. Bernin, Mount Prospect; George J. Bury, Lake Villa, all of Ill.

[73] Assignee: Illinois Tool Works Inc., Chicago, Ill.

[22] Filed: Feb. 2, 1973

[21] Appl. No.: 328,909

[52] U.S. Cl. ............ 340/174 PM, 307/88 R, 335/2, 340/174 HB

[51] Int. Cl. .......... G11c 23/00

[58] Field of Search .... 340/174 PM, 174 SP, 365 L, 340/174 HB; 335/2, 206, 207, 222, 227; 307/88 R

[56] References Cited

UNITED STATES PATENTS

| | | | |
|---|---|---|---|
| 3,060,412 | 10/1962 | McCreary | 340/174 PM |
| 3,170,150 | 2/1965 | Kelar et al. | 340/174 PM |
| 3,175,199 | 3/1965 | Kilburn | 340/174 PM |
| 3,197,747 | 7/1965 | Kramer | 340/174 PM |
| 3,698,531 | 10/1972 | Bernin | 340/174 PM |
| 3,706,984 | 12/1972 | Naganuma et al. | 340/365 L |
| 3,707,686 | 12/1972 | Uekesa et al. | 340/365 L |

*Primary Examiner*—James W. Moffitt
*Attorney, Agent, or Firm*—Olson, Trexler, Wolters, Bushell & Fosse, Ltd.

[57] ABSTRACT

The embodiment of the invention disclosed herein is directed to a solid state switch structure which includes first and second spaced apart closed magnetic core structures. The cores are saturated in the presence of a magnetic field of given field strength. Drive wire means pass through the cores and a pair of sense wires pass through both cores to receive pulse signal information from the drive wire when one or both of the cores is in an unsaturated condition. The saturation of one core provides an output signal from one sense wire and no output signal from the other sense wire while saturation of the other core reverses the output signals from the different sense wire. Movement of the magnetic member from registry with one core to registry with another core will provide mechanically hysteresis. This is accomplished by positioning the magnet and cores in such a manner that a finite movement of the magnet is at all times required between the on and off conditions of the switch.

3 Claims, 11 Drawing Figures

SOLID STATE SWITCH STRUCTURE

BACKGROUND OF THE INVENTION

This invention relates generally to solid state switches, and more particularly to solid state switches using closed loop magnetic core structures with drive and sense wires passing therethrough. The saturable magnetic cores may be cylindrical, rectangular, or toroidal in shape although the toroidal shape is currently preferred. The primary requirement is that the cores are closed loop magnetic structures of unitary configuration.

The recent development of solid state switches of the type having toroidal magnetic cores and movable magnets associated therewith has substantially improved the reliability of the switching function of such structures as key-boards, and the like. Such solid state switches include drive and sense wires passing through a toroidal magnetic core and together therewith function as a transformer device when the permanent magnet is displaced from the core sufficient to unsaturate the same. However, when the toroidal core is saturated by the magnetic field no transformer coupling will occur between the drive and sense wires and no switching action will take place. By displacing the magnet from the core it becomes unsaturated and transformer coupling will take place between the drive and sense wires to effect a switching action.

One of the problems of this type of solid state switch, i.e., a switch structure having a toroidal core and drive and sense lines, and a movable magnet, is that it is an analogue device. In other words, as a magnet is moved toward and away from the toroidal magnetic core the output signal from the sense line, which is transformer coupled thereto, varies in amplitude as the magnet moves. This analogue feature, together with inherent noise in the circuit would cause inconsistent actuation of associated components connected thereto.

SUMMARY OF THE INVENTION

Accordingly, it is an object of this invention to provide a new and improved solid state switch structure which has more than one toroidal magnetic core associated therewith and wherein hysteresis is inherently built in to the switch arrangement to minimize the effects of extraneous energization of circuitry connected thereto.

Another object of this invention is to provide a new and improved solid state switch structure which can be used as an interface with computer logic circuitry.

Still another object of this invention is to provide an improved solid state switch structure which is simple and inexpensive to manufacture while maintaining a high degree of reliability and efficiency in use.

A feature of the present invention is the incorporation of a pair of toroidal magnetic cores spaced apart in such a manner so that movement of a magnet into and out of saturating relation with the cores provides mechanical hysteresis sufficient to uniformly operate control circuitry connected to the output of the sense wires. Movement of the magnet between the cores, from a first position where it saturates one core and unsaturates another core, to a second position where both cores are saturated and then to a third position where it saturates the second core and unsaturates the first core, is accomplished in any of a plurality of different manners, either moving one magnet back and forth, or by moving one or a pair of magnets simultaneously into registry with its associated core and moving another magnet out of registry with its associated core and vice-versa.

Another feature of the present invention is the utilization of a single drive wire passing through both cores with a pair of sense wires, one sense wire for each core, receiving signals from the drive wire when its associated core is in an unsaturated condition. By so spacing the cores relative to their associated magnet or magnets, mechanical hysteresis is built into the switch structure so that extraneous noise will not effect energization of logic circuitry connected thereto until such time as a desired trigger level is obtained.

Briefly, a unipolar drive signal energizes the primary winding formed by the drive line passing through each of the toroidal magnetic cores. The primary winding may be formed either by the drive line merely passing straight through the core or as a result of a signal turn of wire associated with each of the cores. A plurality of turns of wire may also be used to form the primary winding. When either or both of the cores is saturated the sense signal will be eliminated in the core since no transformer coupling takes place. However in the unsaturated core transformer coupling occurs between the drive and sense lines. The output signal from the sense line of the unsaturated core is then utilized in any desired manner, here preferably being shown connected to an input of an RS flip-flop circuit. The switch structure can take any of a plurality of different structural configurations without necessarily departing from the novel concepts of the invention.

Accordingly, many other objects, features, and advantages of this invention will be more fully realized and understood from the following detailed description when taken in conjunction with the accompanying drawings wherein like reference numerals throughout the various views of the drawings are intended to designate similar elements or components.

DETAILED DESCRIPTION OF THE ILLUSTRATED EMBODIMENTS

Figures 1, 2, 3:
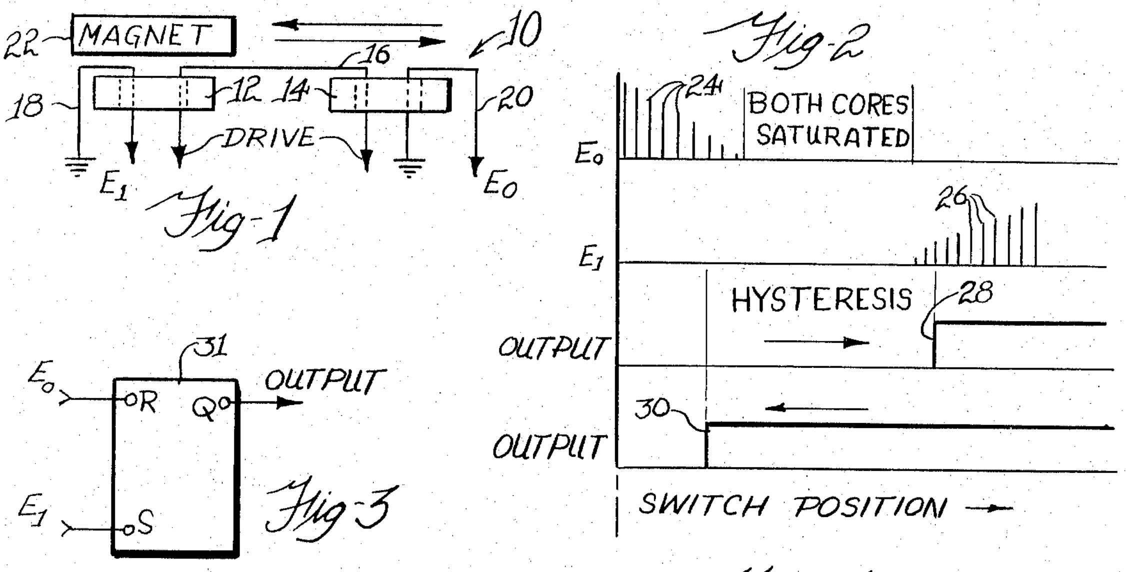
FIG. 1 is a diagrammatic representation of a solid state switch structure constructed in accordance with the principles of this invention.
FIG. 2 represents diagrammatically a plurality of waveforms which are developed at the output of the switch structure and also shows the switching position of the output of an RS flip-flop.
FIG. 3 represents an RS flip-flop logic circuit which can be controlled by the switch of FIG. 1.

Referring now to FIG. 1 there is seen a diagrammatic representation of a solid state switch structure constructed in accordance with the principles of this invention and is designated generally by reference numeral 10. The switch structure 10 includes a pair of spaced apart closed magnetic core structures 12 and 14 which are here shown as being toroidal and positioned horizontally, i.e., the plane of the cores being parallel to the plane of the surface of the magnet used to saturate the cores. It will be understood that the cores 12 and 14 may be oriented vertically if desired. A common drive wire 16 passes through each of the cores 12 and 14 and forms the primary windings of a pair of transformers. The drive wire 16 may pass either directly through the core or form a single loop turn with respect thereto, or if desired may be formed into a plurality of loops or turns about the core. A pair of sense wires 18 and 20 are independent of one another and pass through their respective cores 12 and 14 to receive signal information from the drive wire 16, as a result of transformer coupling, when the associated core is in an unsaturated condition. To selectively saturate the respective cores 12 and 14 a permanent magnet 22 is shown positioned adjacent one of the cores during one instance and movable relative to both cores to be positioned adjacent the other core during another instance. During movement of the magnet between the two extreme positions both cores will be saturated and will remain so for a finite movement of the magnet. The magnet 22, as shown in FIG. 1, is over the core 12 and saturates the same. Therefore, no transformer coupling occurs between the drive line 16 and sense line 18. On the other hand, transformer coupling occurs between the drive line 16 and the sense line 20. Movement of the magnet 22 to the right, as shown in FIG. 1, will unsaturate the core 12 and saturate the core 14. This will reverse the output signals from the sense lines 18 and 20.

FIG. 2 shows the operation of the cores 12 and 14 as a result of their saturated and unsaturated conditions. Here a plurality of output signals 24 are indicated as the output $E_0$ as producing an output from the sense line 20. With the magnet as shown in FIG. 1 no output is derived from the sense line 18. Movement of the magnet from left to right ultimately saturates the core 14 and eliminates the output signals 24. The spacing of the cores 12 and 14 are such that a position is found between the cores that allows the magnet 22 to saturate both cores. Therefore, no output signal is developed from either sense line, this being indicated in FIG. 2. Further movement of the magnet to the right ultimately unsaturates the core 12 to allow transformer coupling of the drive signals into the sense line 18. This is indicated by the output signals 26 which are derived at the line $E_1$.

When the voltages $E_0$ and $E_1$ are connected to the input of a logic circuit, such as an RS flip-flop 31 as shown in FIG. 3, it will switch the state of the flip-flop when the proper polarity signal is sensed. When the magnet 22 is moved to the right a point is reached where the output of the flip-flop raises to a logic "1" level this point being indicated by reference numeral 28 in FIG. 2. When the magnet is again moved from right to left a second point is reached as shown by reference numeral 30, FIG. 2, where the output of the flip-flop will revert back to its logic "0" state. The difference between the movement causing the rise 28 and the fall 30 of the output signal is the inherent hysteresis of the switching device. This can be controlled by, among other things, the spacing between the cores 12 and 14.

Figure 5:
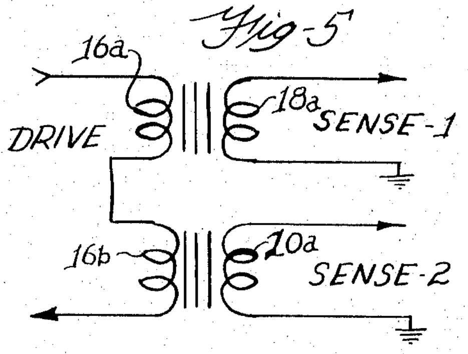
FIG. 5 represents schematically the electrical equivalent of the transformer coupling obtained in the switch of this invention.

For a better understanding of the nature of the transformer action of the drive and sense wires reference is now made to FIG. 5 which shows a common drive line forming a pair of primary windings **16*a* and 16*b* which are connected in series with one another. The separate secondary windings 18*a* and 20*a* represent the sense lines 18 and 20, respectively. When the transformer cores shown in FIG. 5** are saturated no output signal will be transformer coupled between the primary and secondary windings.

In operation, the two saturated cores are arranged such that the magnet will saturate either one or both of the cores simultaneously. When a drive signal energizes the unsaturated core, a magnetic flux change will occur in the associated sense wire. As the magnetic flux from the magnet increases in the core the flux change from the drive line is accordingly decreased. This is shown by the sloping decreases in pulses 24 and sloping increases in pulses 26 of FIG. 2.

When the output voltage of the sense lines 18 and 20 are of sufficient amplitude, i.e., equal to or above the threshold level of the RS flip-flop of FIG. 3, it will trigger the flip-flop. For example, $E_0$ triggers the reset input and $E_1$ triggers the set input. Once triggered, the flip-flop 31 will remain in its last triggered state until it is triggered by a change in input signal. Since only one trigger pulse is generated at any one time the output of the flip-flop is continuous as shown in FIG. 2.

The hysteresis of the switch is controlled by the spacing of the cores 12 and 14 and the permanent magnet 22. Hysteresis is the distance the magnet must move to turn off one trigger and turn on the other, this being shown by the spacing between on/off conditions in FIG. 2. Any desired waveform may be utilized between the drive and sense lines for transformer coupling since the end result of the output of flip-flop 31 will be a change in logic level.

Figure 4:
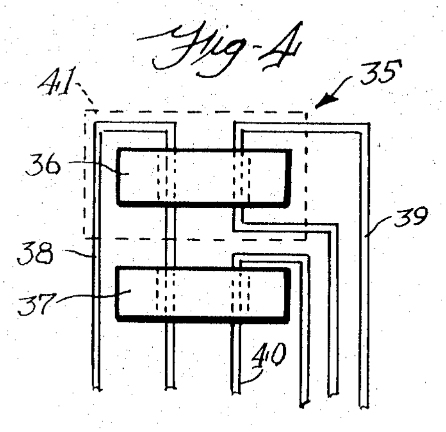
FIG. 4 is another diagrammatic representation of an alternate physical arrangement of the switch of this invention.

Referring now to FIG. 4 there is seen a diagrammatic representation of a solid state switch structure designated generally by reference numeral 35. This is a plan view and shows a pair of vertically disposed toroidal magnetic cores 36 and 37 spaced apart a predetermined distance. However, the spacing between cores 36 and 37 is somewhat closer than cores 12 and 14 of FIG. 1 and this feature will reduce the distance between the hysteresis characteristic of FIG. 2. A common drive line 38 passes through both cores for inducing therein signal information. If one of the cores is unsaturated this signal information will be transformer coupled into the sense line associated therewith. A magnet means 41 is placed in registry with one of the cores at a time and functions in substantially the same manner as that described above with regard to FIG. 1.

Figure 6:
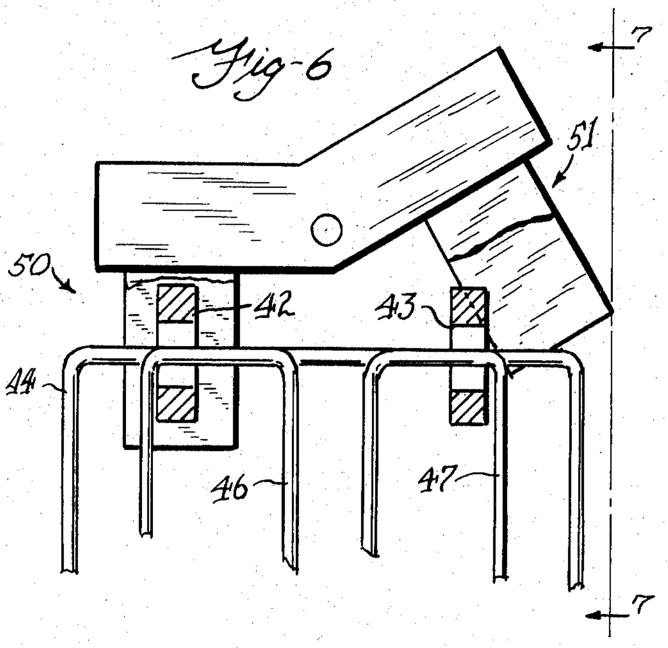
FIG. 6 is a side view of one physical structure of a switch of this invention.
Figure 7:
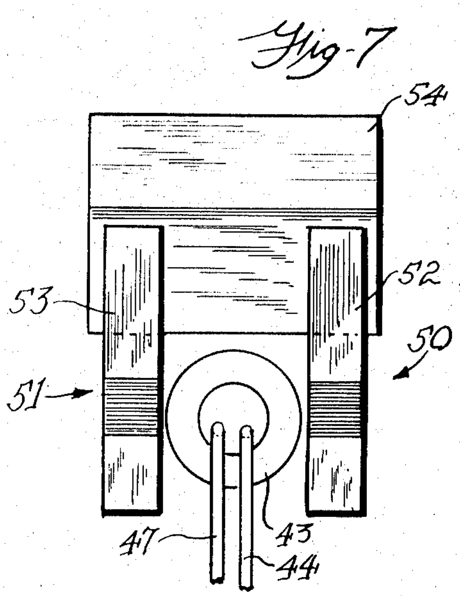
FIG. 7 is an end view as taken along line 7—7 of FIG. 6.

FIGS. 6 and 7 show a structural configuration which utilizes the basic concepts of this invention. Here a pair of vertically disposed toroidal magnetic cores 42 and 43 are positioned at spaced apart locations and each receive therethrough a common drive line 44. The cores 42 and 43 have separate and independent sense lines 46 and 47, respectively, to act as secondary windings of transformers when their associated cores are not saturated. Here the magnet means is formed by two pairs of magnets 50 and 51 disposed on opposite sides of each of the cores. The magnet pairs are selectively positioned adjacent one core to saturate the same and selectively displaced from the other core to unsaturate it. However, when the switch is actuated the magnet pairs previously unsaturating its core will move into position for saturating the core while the other magnet pair will move out of position. The pair of magnets 50 comprises a first magnet 52 located on one side of the core and a second magnet 53 located on the other side of the core. The pair of magnets 52 is constructed in the same manner. The magnets are firmly secured to a rocker type actuating button 54 which pivots about a point 56.

In operation, the core 42, as seen in FIG. 6 is saturated and no transformer coupling between the drive line 44 and the sense line 46 will occur. However, core 43 is unsaturated and transformer coupling between the drive line 44 and the sense line 47 takes place. Upon pressing downwardly on the raised portion of the rocker type actuating button 54 the pair of magnets 51 will be placed adjacent the core 43 for saturating the same. This action will simultaneously move the pair of magnets 50 and unsaturate the core 42. Therefore, output signals from sense line 47 will cease while output signals from sense line 46 will commence. The rocker type action of the button 54 will place the magnet pairs 50 and 51 at a position where both cores are saturated and no output signal obtained from either.

Figure 8:
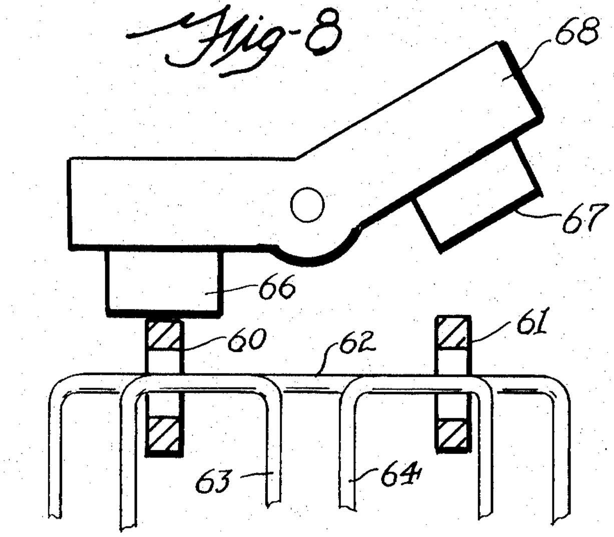
FIG. 8 is another physical structure of the switch of this invention.
Figure 9:
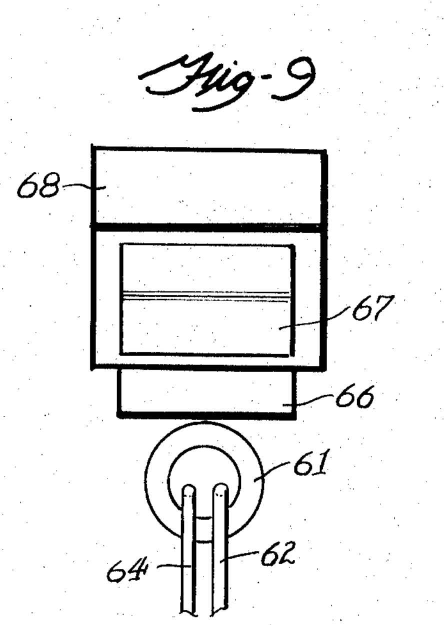
FIG. 9 is an end view of the switch of FIG. 8.

Referring now to FIGS. 8 and 9 there is seen still another alternate form of a solid state switch structure formed in accordance with the principles of this invention. Here a pair of toroidal magnetic cores 60 and 61 are spaced apart a given distance and receive a common drive wire 62 passing therethrough. Independent sense wires 63 and 64 are associated with the cores 60 and 61, respectively, and, in the usual manner, form the secondary windings of a pair of transformers when their associated cores are in an unsaturated condition. A pair of magnets 66 and 67 are disposed adjacent the toroidal cores 60 and 61, respectively, selectively to be moved into close proximity with their associated core for saturating the same and to be moved away from the core for unsaturating the same. The magnets are secured to a toggle type actuator 68 which functions substantially in the same manner as the toggle actuator 54 of FIG. 6 and FIG. 7. The distinction of the structure of FIGS. 8 and 9 is that only a single magnet is used for each toroidal core rather than a pair of magnets. Therefore, the operation of the switch of FIGS. 8 and 9 is substantially the same as set forth above.

Figures 10, 11:
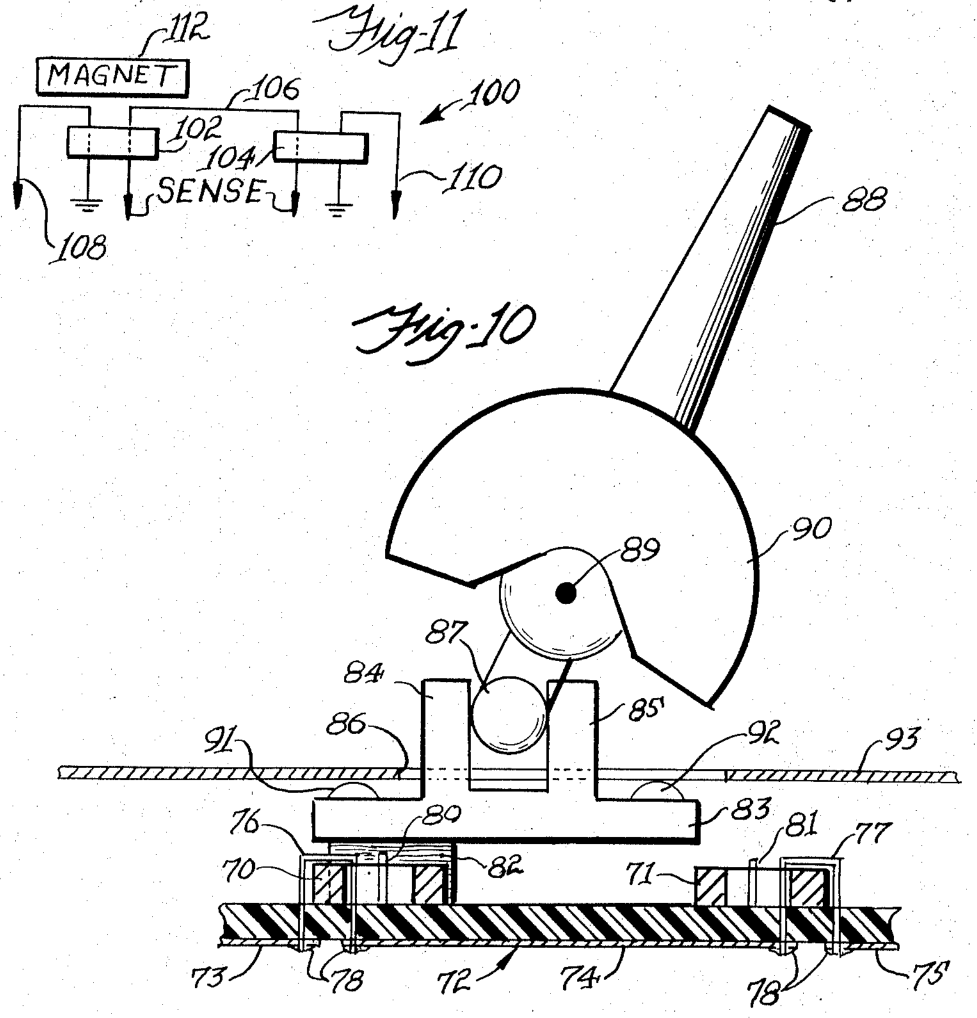
FIG. 10 is one structural configuration of the switch of this invention which can be used when associated with a printed circuit switch construction.
FIG. 11 is an alternate configuration of the switch structure of FIG. 1.

Referring now to FIG. 10 there is seen another form of solid state switch structure constructed in accordance with this invention. Here a pair of horizontally disposed toroidal magnetic cores 70 and 71 are spaced apart and interconnected by a common drive line 72. However, in this instance the drive line 72 is formed by printed circuit portions 73, 74, and 75 interconnected by U-shaped wires 76 and 77 which are wrapped about a portion of the core and extend through a printed circuit board and soldered in position as shown by reference numeral 78. In utilizing the configuration as shown in FIG. 10 a plurality of switches can be formed on a common printed circuit board if desired.

A pair of sense wires 80 and 81, have portions thereof at angles to the drive line 72, and in like manner are formed by U-shaped wires extending through the printed circuit board and connected to suitable printed circuit wiring at the bottom of the board. A single permanent magnet 82 slidably moves between two positions, one position adjacent the core 70 and the other position adjacent the core 71. The slidable magnet is secured to a slide element 83 which has a pair of upstanding portions 84 and 85 extending through an opening 86 formed in a top panel member 93. Positioned between the upstanding portions 84 and 85 is a ball or socket like member 87 which has secured thereto a bat-handle type actuator 88 pivoted at a pivot point 89. The handle and pivot may include a dust protector or hood 90 as shown.

A pair of rollers or slides 91 and 92 engage the under surface of the top panel 93 and may engage detent means, not shown, for stopping the back and forth travel of the magnet and slide at given locations.

Referring now to FIG. 11 there is seen an alternate form of the switch structure of this invention. In this instance the switch structure is designated generally by reference numeral 100 and includes a pair of spaced apart closed magnetic structures 102 and 104 which may also be toroidal devices similar to that of FIG. 1. A common sense line 106 passes through both cores 102 and 104 and may be connected to suitable decoding circuitry to detect phase signal outputs therefrom. A pair of drive wires 108 and 110 pass through the cores 102 and 104, respectively, and are arranged for connection to out of phase signals which may be generated by a common clock and phase splitting circuitry. To selectively saturate the respective cores 102 and 104 a movable permanent magnet 112 is provided and functions substantially in the same manner as that described above with regard to FIG. 1. During movement of the magnet between the two extreme positions both cores will be saturated and will remain so for a given distance of travel of the magnet.

While several embodiments of the present invention have been shown herein it will be understood that still other modifications and variations may be effected without departing from the spirit and scope of the novel concepts disclosed and claimed herein.

The invention is claimed as follows:

1. An electrical switch comprising first and second spaced-apart saturable magnetic cores, a drive winding passing through said first and said second magnetic cores for receiving a single polarity input signal, a first sense winding passing through said first magnetic core, a second sense winding passing through said second magnetic core and magnetic means movable adjacent said first and second magnetic cores which is capable of saturating either said first magnetic core or said second magnetic core to a controlled degree according to its proximity thereto, said drive winding and said first and second sense windings being wound so that the signals induced in the said first and second sense windings are both at a minimum magnitude and said first and second cores are both saturated when said magnetic means is positioned at a predetermined intermediate location, said first sense winding provides output signals of a controlled magnitude which have a given polarity when said first magnetic core is saturated to a controlled degree less than full saturation and said second sense winding provides output signals of a controlled magnitude which are of said given polarity when said second magnetic core is saturated to a controlled degree less than full saturation and bistable means having set and reset input terminals, said first sense winding being coupled to its set input terminal and said second sense winding being coupled to its reset input terminal.

2. The switch of claim 1 wherein said magnetic means is a permanent magnet having north and south poles with its north pole facing said first magnetic core and its south pole facing said second magnetic core, said drive winding is wound in a first direction through said first magnetic core and in an opposite direction through said second magnetic core, said first sense winding is wound in a first direction through said first magnetic core and said second sense winding is wound in a second direction which is opposite to said first direction through said second magnetic core.

3. The switch of claim 1 wherein said magnetic means comprise first and second permanent magnets and said electrical switch comprises a toggle lever having first and second arms and a pivot point located intermediate said arms, each of said permanent magnets being secured to one of said arms so that the proximity of said first magnet to said first core increases from said intermediate location as the proximity of said second magnet to said second core decreases, and vice versa, in accordance with the position of said toggle lever.

* * * * *